United States Patent
Rousset et al.

(10) Patent No.: US 11,115,070 B2
(45) Date of Patent: Sep. 7, 2021

(54) METHOD FOR EMITTING AND RECEIVING A RADIOFREQUENCY SIGNAL IN A SATELLITE TRANSMISSION SYSTEM, CORRESPONDING EMITTER, CHARACTERIZATION RECEIVER AND COMPUTER PROGRAM

(71) Applicant: ENENSYS TeamCast, Cesson-Sevigne (FR)

(72) Inventors: Olivier Rousset, Saint Aubin d'Aubigne (FR); Cyril Bernier, Saint-Médard sur Ille (FR)

(73) Assignee: ENENSYS TEAMCAST, Cesson-Sevigne (FR)

( * ) Notice: Subject to any disclaimer, the term of this patent is extended or adjusted under 35 U.S.C. 154(b) by 0 days.

(21) Appl. No.: 16/976,899

(22) PCT Filed: Jan. 29, 2019

(86) PCT No.: PCT/EP2019/052110
§ 371 (c)(1),
(2) Date: Aug. 31, 2020

(87) PCT Pub. No.: WO2019/166168
PCT Pub. Date: Sep. 6, 2019

(65) Prior Publication Data
US 2021/0044311 A1  Feb. 11, 2021

(30) Foreign Application Priority Data
Mar. 1, 2018 (FR) ........................ 1851817

(51) Int. Cl.
*H04B 1/04* (2006.01)
*H04B 7/185* (2006.01)

(52) U.S. Cl.
CPC ....... *H04B 1/0475* (2013.01); *H04B 7/18513* (2013.01); *H04B 2001/0425* (2013.01)

(58) Field of Classification Search
CPC .......... H04B 1/04; H04B 1/0475; H04B 1/16; H04B 1/40; H04B 7/18504;
(Continued)

(56) References Cited

U.S. PATENT DOCUMENTS 6,957,044 B2 * 10/2005 Beech ................ H04B 7/18513
375/298
8,391,781 B2 * 3/2013 Hausman ........... H04B 7/18519
455/12.1

(Continued)

FOREIGN PATENT DOCUMENTS

| EP | 3190720 A1 | 7/2017 |
| GB | 2375016 A | 10/2002 |
| WO | 2016000787 A1 | 1/2016 |

OTHER PUBLICATIONS

International Search Report and Written Opinion dated Apr. 2, 2019 for corresponding International Application No. PCT/EP2019/052110, filed Jan. 29, 2019.

(Continued)

*Primary Examiner* — Quochien B Vuong
(74) *Attorney, Agent, or Firm* — David D. Brush; Westman, Champlin & Koehler, P.A.

(57) ABSTRACT

A method for receiving a radiofrequency signal in a system having an emitter, a satellite and at least one characterization receiver implementing a characterization phase of the satellite. The method includes: transmitting to the emitter, over a first transmission link, at least one transmission command of at least one reference signal, receiving the at least one reference signal, emitted by the emitter over a second transmission link via the satellite, termed the received signal, estimating at least one distortion generated by the (Continued)

satellite, from the at least one reference signal, delivering at least one piece of information on compensation of the distortions affecting the received signal, and transmitting to the emitter, over the first transmission link, the at least one piece of distortion compensation information.

18 Claims, 5 Drawing Sheets

(58) Field of Classification Search
CPC ............ H04B 7/18506; H04B 7/18508; H04B 7/1851; H04B 7/18513; H04B 7/18515; H04B 7/18517; H04B 7/18523; H04B 7/18528; H04B 10/07; H04B 10/0731; H04B 10/29; H04B 10/40; H04B 10/118; H04B 10/2507; H04B 17/15; H04B 17/21; H04B 17/29; H04B 2001/0425; H04W 84/06
See application file for complete search history.

(56) References Cited

U.S. PATENT DOCUMENTS

| | | | |
|---|---|---|---|
| 9,203,450 B2* | 12/2015 | Beidas | H04B 1/0475 |
| 9,553,754 B1* | 1/2017 | Dorosenco | H04B 7/18517 |
| 9,621,381 B2* | 4/2017 | Kim | H04B 7/18543 |
| 10,027,404 B2* | 7/2018 | Avellan | H04B 17/40 |
| 10,033,568 B2* | 7/2018 | Piazza | H04B 7/00 |
| 10,530,540 B2* | 1/2020 | Beidas | H04W 84/06 |
| 2011/0312290 A1 | 12/2011 | Beeler et al. | |
| 2015/0098521 A1 | 4/2015 | Beidas et al. | |

OTHER PUBLICATIONS

French Search Report and Written Opinion dated Nov. 2, 2018 for corresponding French Application No. 1851817, filed Mar. 1, 2018.
English translation of the Written Opinion of the International Searching Authority dated Apr. 8, 2019 for corresponding International Application No. PCT/EP2019/052110, filed Jan. 29, 2019.
"DVB-S2 Modem Algorithms Design and Performance over Typical Satellite Channels" (E. 5 Casini et al., International Journal of Satellite Communications and Networking 2004; 22:281-318).
"A Generalized Memory Polynomial Model for Digital Predistortion of RF Power Amplifiers" (IEEE Transactions On Signal Processing, vol. 54, No. 10, Oct. 2006).
"Digital Video Broadcasting (DVB); Second generation framing structure, channel coding and modulation systems for Broadcasting, Interactive Services, News Gathering and other broadband satellite applications; Part 1: DVB-S2" Annex H.7, Draft ETSI EN 302 307-1 V1.4.1 (Jul. 2014).

* cited by examiner

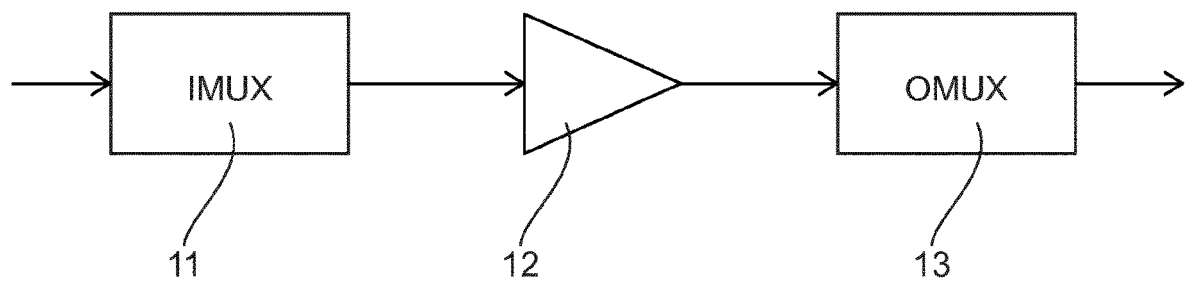
Fig. 1
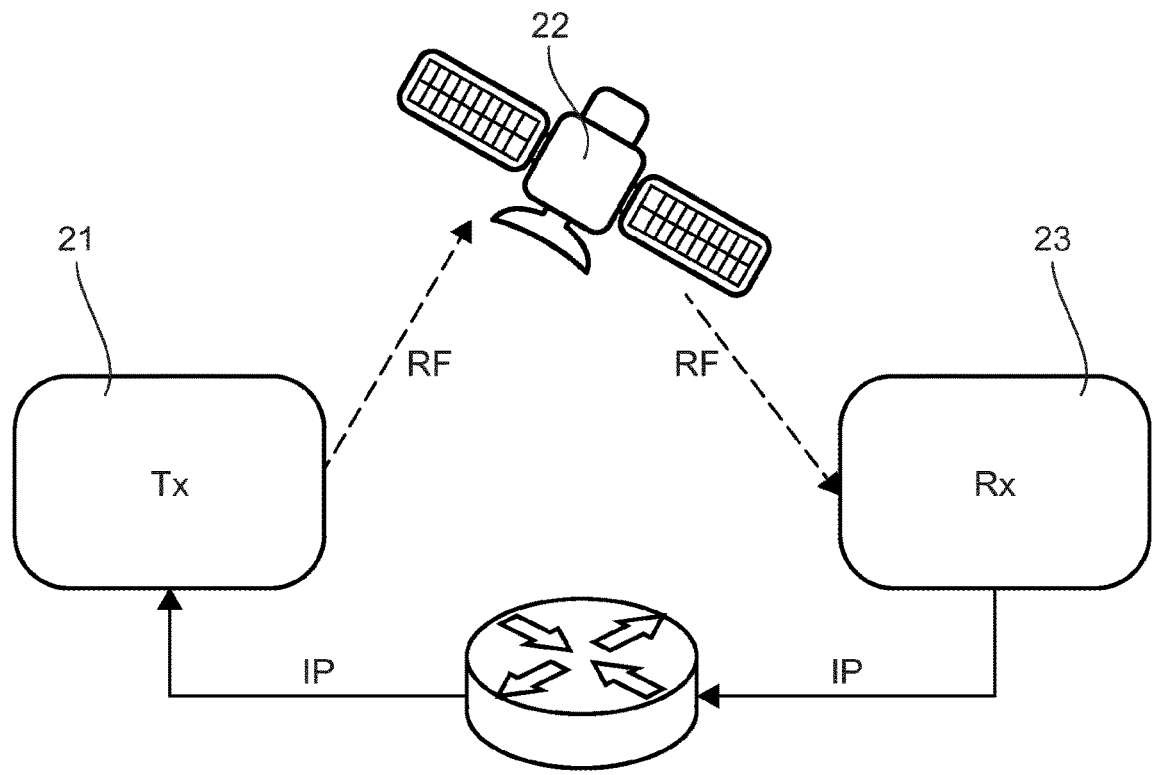
Fig. 2
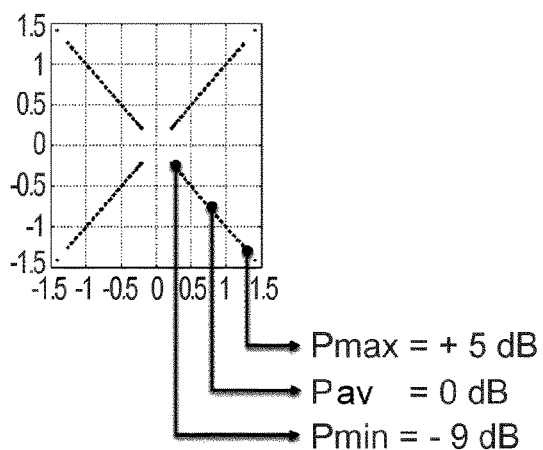
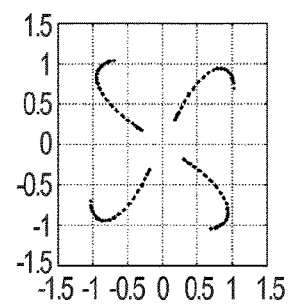
Pmax = + 5 dB
Pav = 0 dB
Pmin = − 9 dB
Fig. 9A          Fig. 9B

METHOD FOR EMITTING AND RECEIVING A RADIOFREQUENCY SIGNAL IN A SATELLITE TRANSMISSION SYSTEM, CORRESPONDING EMITTER, CHARACTERIZATION RECEIVER AND COMPUTER PROGRAM

CROSS-REFERENCE TO RELATED APPLICATIONS

This Application is a Section 371 National Stage Application of International Application No. PCT/EP2019/052110, filed Jan. 29, 2019, which is incorporated by reference in its entirety and published as WO 2019/166168 A1 on Sep. 6, 2019, not in English.

1. FIELD OF THE INVENTION

The field of the invention is that of satellite transmissions.

More specifically, the invention proposes an adaptive precorrection technique, for compensating, at least partially, the distortions linked to the satellite transponder, in a satellite transmission system.

In particular, such a transmission system comprises an emitter, a satellite and at least one receiver. At least one receiver in the system is a characterization receiver, enabling the characterization of distortions linked to the satellite transponder.

The invention can be applied to any satellite transmission system, and in particular to the broadcasting networks according to the DVB-S, DVB-S2, or DVB-S2X ("Digital Video Broadcasting-Satellite") standards, or other existing or future standards.

In particular, the invention concerns single-carrier communications, implementing transmission using a single carrier via a transponder, or multi-carrier communications, implementing transmission using several carriers via a transponder, in point-to-point or point-to-multipoint links.

For example, single-carrier communications can be used in broadcast type applications, for distribution to a network headend, to terrestrial emitters, to individual receivers (Direct-to-Home), etc, or in broadband type applications, for example IP Trunking, Mobile backhauling, etc.

Multi-carrier communications, for their part, can be used in DSNG (Digital Satellite News Gathering) broadcast type applications, in VSAT (Very Small Aperture Telecommunications) broadband type applications, etc.

2. PRIOR ART

As presented in particular in Annex H.7 of the DVB-S2 standard "Digital Video Broadcasting (DVB); Second generation framing structure, channel coding and modulation systems for Broadcasting, Interactive Services, News Gathering and other broadband satellite applications; Part 1: DVB-S2" ETSI EN 302 307-1 v1.4.1 (2014-07), and illustrated in FIG. 1, satellite transponders are classically characterized by three elements:

- a selective input filter, IMUX 11, whose center frequency varies in relation to temperature;
- a power amplifier 12, for example a traveling-wave tube amplifier TWTA;
- an output filter, OMUX 13, generally less selective than the input filter IMUX 11, whose center frequency variations in relation to temperature are minimal.

The distortions introduced by the input filter IMUX 11 and by the output filter OMUX 13 on the signal passing through the transponder are linear and characterized by amplitude and group delay curves in relation to the frequency. Examples of curves illustrating the characteristics of input and output filters, in terms of gains and group delay, are provided for instance in Annex H.7 of the aforementioned DVB-S2 standard.

The distortions introduced by the power amplifier 12 to the signal passing through the transponder are non-linear and characterized by an AM/AM curve, representing an output power of the amplifier in relation to an input power, and an AM/PM curve, representing a phase shift output of the amplifier in relation to an input power. Examples of AM/AM and AM/PM curves illustrating the characteristics of the amplifier are also provided in Annex H.7 of the aforementioned DVB-S2 standard.

Such distortions introduced by the satellite degrade the radiofrequency signal received by the receiver. Therefore, there exists the need for a new transmission technique making it possible to characterize and compensate, or at least reduce, the distortions introduced by the satellite.

3. SUMMARY OF THE INVENTION

In one embodiment, the invention proposes a method for receiving a radiofrequency signal, in a system comprising an emitter, a satellite and at least one receiver, among which at least one characterization receiver, implementing a characterization phase of the satellite, comprising:

- transmitting to the emitter, over a first transmission link between the characterization receiver and the emitter, at least one transmission command of at least one reference signal,
- receiving said at least one reference signal, emitted by the emitter over a second transmission link between the emitter and the characterization receiver via the satellite to be characterized, termed the received signal,
- estimating at least one distortion generated by the satellite, from said at least one reference signal, delivering at least one piece of information on compensation of the distortions affecting the received signal,
- transmitting to the emitter, over said first transmission link, said at least one piece of information on compensation of the distortions.

The solution proposed, according to at least one embodiment, thus makes it possible to automatically determine, at characterization receiver level, during a characterization phase, the satellite transponder characteristics in terms of linear and/or non-linear distortions. These characteristics are transmitted from the characterization receiver to the emitter over a first transmission link, via a satellite (which may be the same as the satellite to be characterized or another satellite) or not, so that the emitter can emit a useful, precorrected radiofrequency signal during an operating phase. In particular, such a first transmission link implements a low-bitrate transmission, which can be implemented temporarily during the characterization phase.

In this way, the linear and/or non-linear distortions, introduced by the satellite transponder into the radiofrequency signal received by the network receivers (receivers implementing the characterization or not), over the second transmission link via satellite, are at least partially compensated.

In order to determine the characteristics of the satellite transponder in terms of linear and/or non-linear distortions, the characterization receiver sends the emitter at least one transmission command of at least one reference signal. Such a reference signal is for example transmitted from the emitter to the characterization receiver, over the second transmission link via satellite, in a physical layer frame generally used for padding or bitrate adaptation, such as the Dummy PLFRAME of the DVB-S2/S2X standard. In this way, the reference signal does not disturb the receivers other than the characterization receiver(s).

In another embodiment, the invention concerns a corresponding characterization receiver.

The reception technique according to the invention can therefore be implemented in various ways, especially in hardware and/or software form.

In another embodiment, the invention proposes a corresponding transmission method, implementing a characterization phase of the satellite comprising:
- receiving at least one transmission command of at least one reference signal, from said characterization receiver, over a first transmission link between the characterization receiver and the emitter,
- transmitting said at least one reference signal, to the characterization receiver, over a second transmission link between the emitter and the characterization receiver via the satellite,
- receiving at least one piece of information on compensation of the distortions affecting the signal received by the characterization receiver, from the characterization receiver, over the first transmission link.

Such a method, implemented at emitter level, is intended in particular to receive at least one transmission command of at least one reference signal and at least one piece of information on compensation of the distortions obtained by the radiofrequency signal reception method as described here above.

In another embodiment, the invention concerns a corresponding emitter.

The radiofrequency signal transmission technique according to the invention can therefore be implemented in various ways, especially in hardware and/or software form.

For example, at least one step of the transmission or reception technique according to one embodiment of the invention can be implemented:
- on a reprogrammable computation machine (a computer, a processor for example of the DSP [Digital Signal Processor] type, a microcontroller, etc) executing a program comprising a sequence of instructions,
- on a dedicated computation machine (for example a set of logic gates such as an FPGA [Field Programmable Gate Array] or an ASIC [Application-Specific Integrated Circuit], or any other hardware module).

In particular, the computer program can use any programming language whatsoever, and can take the form of source code, object code or intermediate code between source code and object code, such as in a partially compiled form or in any other desirable form whatsoever.

One embodiment of the invention is therefore also aimed at protecting one or more computer programs comprising instructions adapted to implementing the transmission or reception methods as described here above when this program or these programs are executed by a processor, as well as at least one information carrier readable by a computer comprising instructions of at least one computer program as mentioned here above.

One embodiment of the invention also concerns a system comprising an emitter, a satellite and at least one characterization receiver such as described here above.

4. LIST OF FIGURES

Other characteristics and advantages of the invention shall appear more clearly from the following description of a particular embodiment, given by way of a simple illustratory and non-exhaustive example, and from the appended drawings of which:

FIG. 1, described with reference to the prior art, illustrates the payload of a satellite transponder;

FIG. 2 illustrates an example of a transmission system according to one embodiment of the invention;

Figures 10, 11:
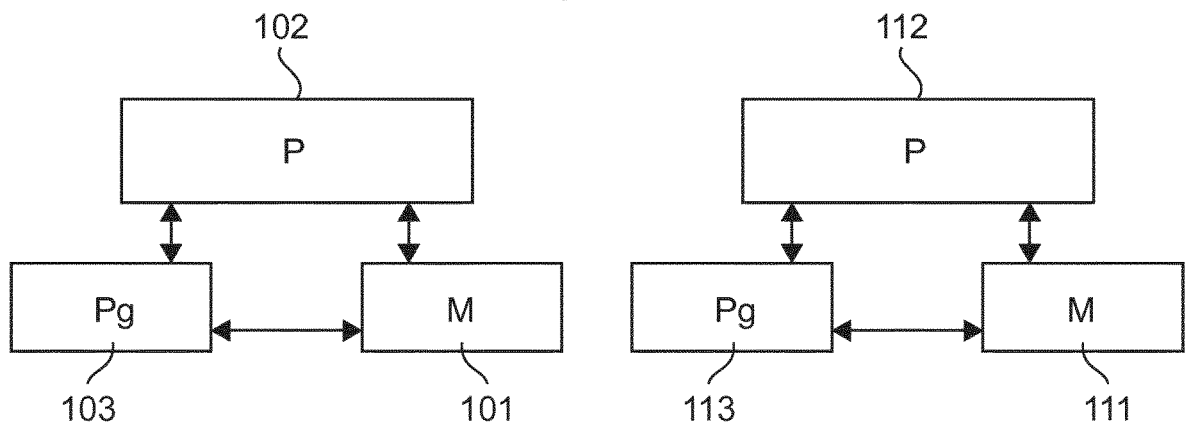
Figure 4:
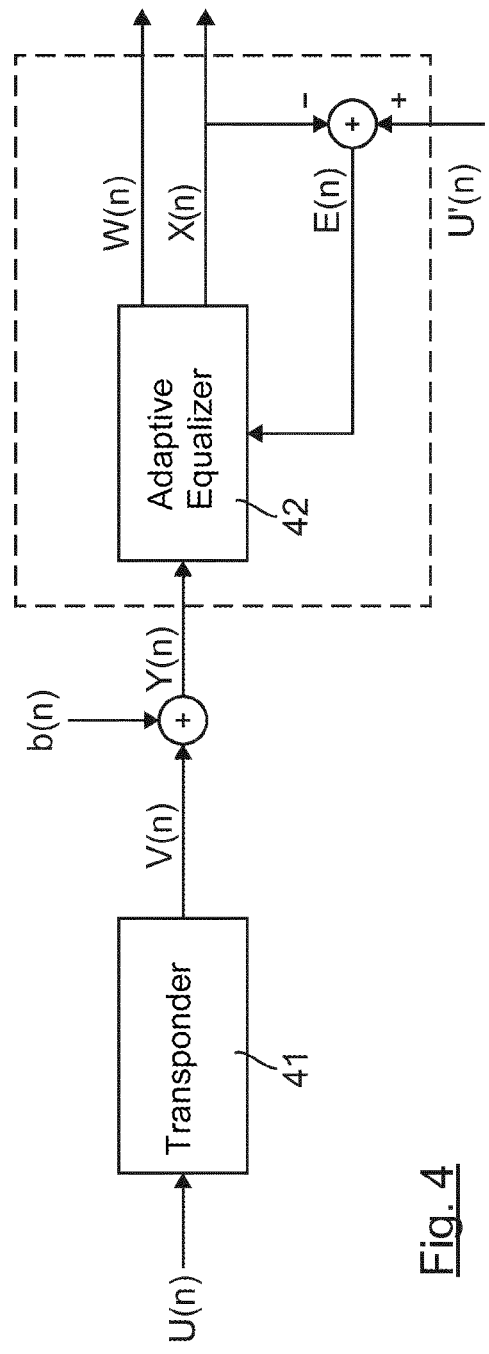
Figure 5:
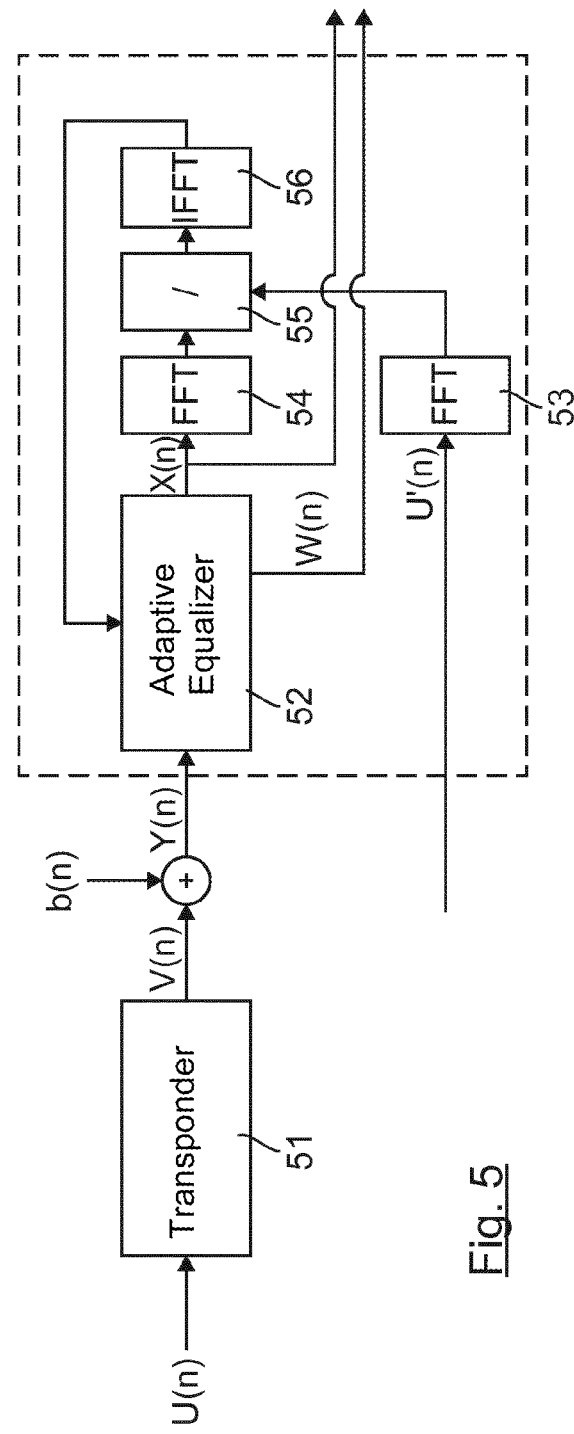
Figure 6:
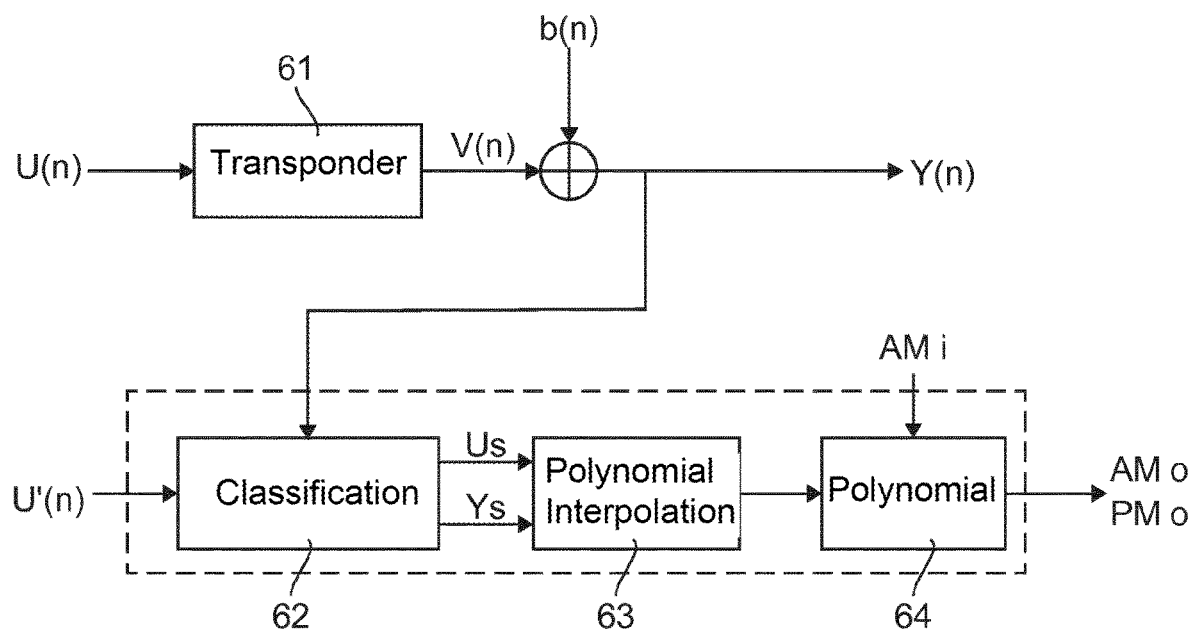
Figure 7:
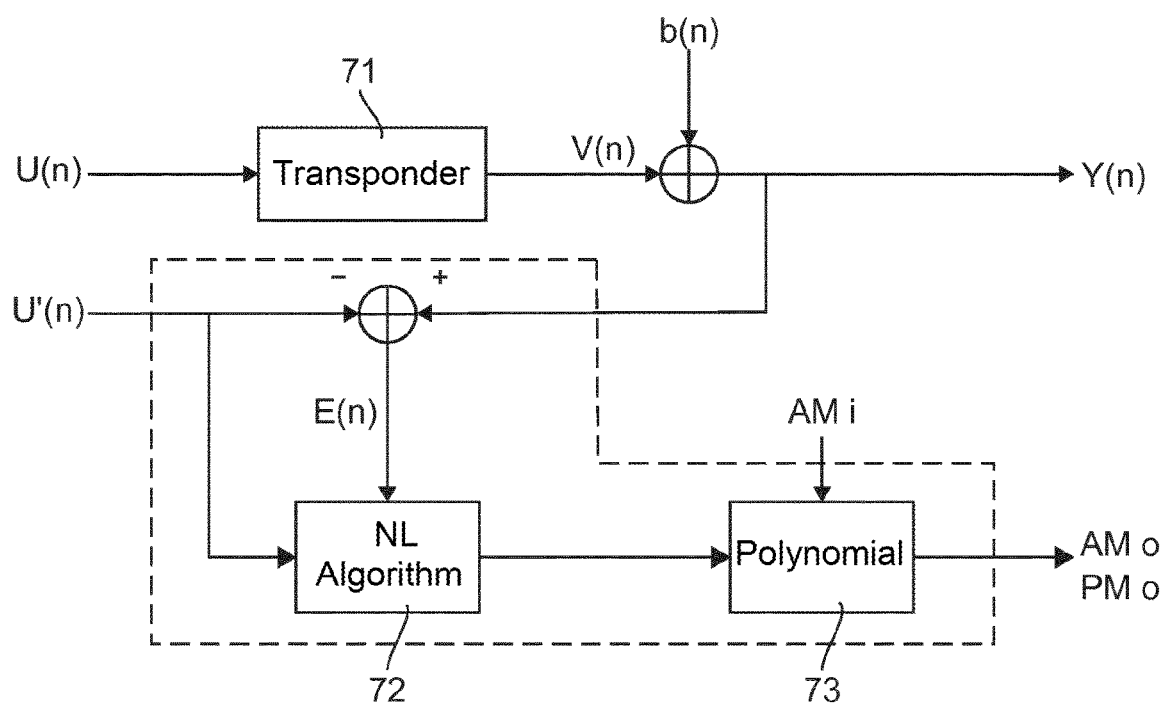
Figure 8:
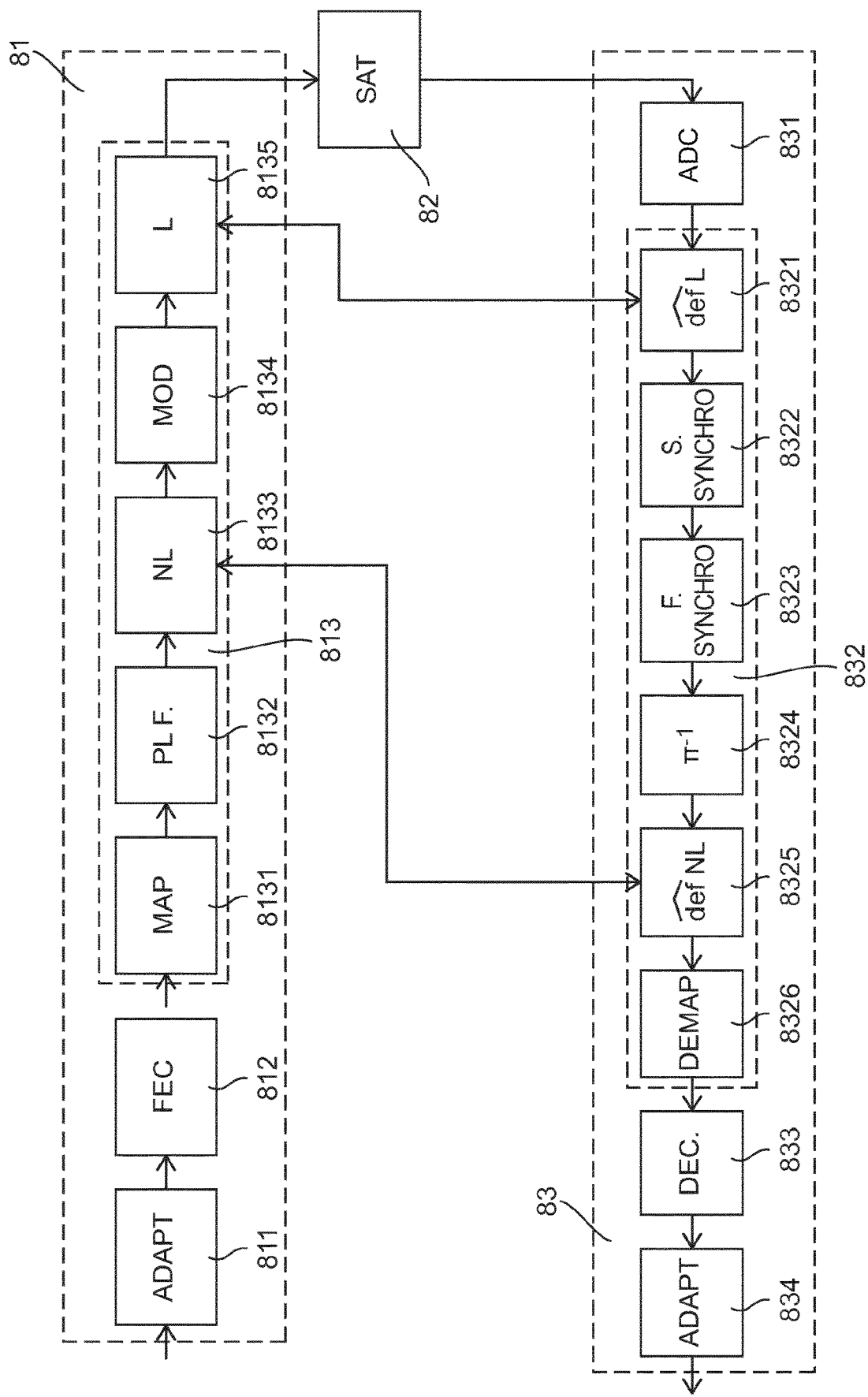

FIGS. 4 and 5 present examples of architecture for estimating the linear distortions introduced by the satellite transponder;

FIGS. 6 and 7 present examples of architecture for estimating the non-linear distortions introduced by the satellite transponder;

FIG. 8 illustrates an example of a transmission chain according to one embodiment of the invention;

FIGS. 9A and 9B illustrate the constellations associated with a reference signal according to one embodiment of the invention;

FIGS. 10 and 11 present, respectively, the simplified structure of a characterization receiver and of an emitter, according to one embodiment of the invention.

5. DESCRIPTION OF EMBODIMENTS OF THE INVENTION

5.1 General Principle

The invention is set in the context of satellite transmissions.

FIG. 2 illustrates an example of a transmission system in which the invention can be implemented. Such a system comprises an emitter 21, implementing for example a modulator according to the DVB-S2, DVB-S2X standards, or another existing or future standard, a satellite 22, and at least one receiver. At least one receiver in the system is a characterization receiver 23. The system can also comprise other receivers not implementing characterization, termed "normal" receivers, especially individual receivers (also called satellite terminals).

In the context of a point-to-multipoint link, several characterization receivers can be used and distributed across a territory, in order to improve the transmission channel estimation.

Two transmission links are defined between the emitter 21 and the characterization receiver 23:
- a first transmission link between the characterization receiver 23 and the emitter 21, via a satellite or not, used in particular for setting the emitter, implementing for example low-bitrate transmission, which could be temporary during the characterization phase, and
- a second transmission link between the emitter 21 and the characterization receiver 23, passing through the satellite 22, used to transmit the DVB-S/S2/S2X signal for example, implementing high bitrate broadcast or broadband type radiofrequency transmission.

For example, the bitrate over the first link is in the range of several kilobits per second, and the bitrate over the second link is in the range of several hundred megabits per second. More generally, the bitrate over the first link is lower than that over the second link.

The general principle of the invention relies on the implementation of a characterization phase of the satellite, during which the characteristics of the satellite transponder are determined, in terms of distortion, through the transmission, over the second transmission link passing through the satellite, of at least one reference signal known to the characterization receiver, and the transmission, over the first transmission link, of these characteristics to the emitter.

In this way, during an operating phase, the emitter can emit, over the second transmission link passing through the satellite, a useful, precorrected radiofrequency signal to take into account the characteristics of the satellite transponder (in particular linear and non-linear distortions introduced by the satellite), which allows, a priori, improved reception of the useful signal for all the network receivers (characterization receiver[s] and/or "normal" receiver[s]).

In other terms, the characterization receiver 23 can receive radiofrequency signals emitted by the emitter 21 via the transponder 22, i.e. over the second transmission link, for example of the DVB-S/S2/S2X type. In an advantageous, but not mandatory, embodiment, such a characterization receiver possesses a good quality receiving antenna (for example a large satellite dish, a professional universal low-noise block downconverter) in order to increase the level of received signal in relation to receiver noise, and to limit the phase noise. It is therefore possible to obtain better characterization of the distortions introduced by the transponder.

The characterization receiver 23 can also exchange information with the emitter 21 over the first transmission link, for example through an Ethernet/IP type interface. Naturally, a communication protocol other than the IP protocol can be used. Indeed, the emitter 21 and the characterization receiver 23 are generally not on the same geographical site, and can be several hundred kilometers apart. Through the first transmission link, the characterization receiver 23 can manage the characterization phase by requesting for example that the emitter 21 emits a reference signal, decreases or increases the transmission power, etc. Once the characterization phase is completed, the characterization receiver 23 can provide the emitter 21 with the parameters necessary for precorrection of the transponder, invariably over the first transmission link. Communication between the characterization receiver and the emitter can then be interrupted. In other terms, the characterization receiver can be switched off or go on standby, once the characterization phase has been carried out. The characterization receiver can then operate only occasionally.

Figure 3:
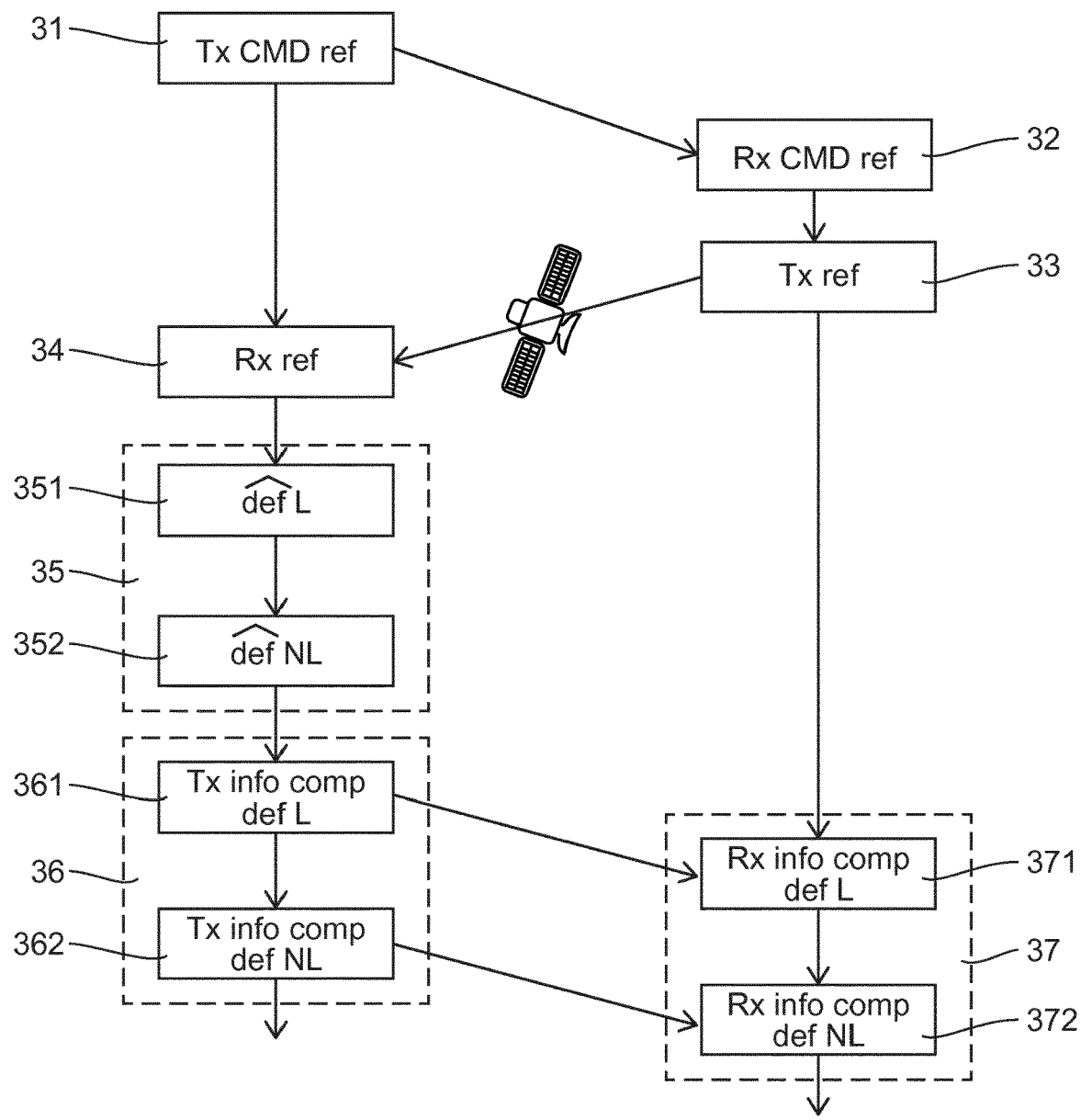
FIG. 3 illustrates the main steps implemented for the characterization phase according to one embodiment of the invention.

Referring to FIG. 3, we present the main steps implemented by a characterization receiver and an emitter according to one embodiment of the invention, for characterizing the distortions introduced by the satellite transponder.

By taking the transmission system illustrated in FIG. 2, the characterization receiver 23 transmits (31) to the emitter 21, over the first low-bitrate transmission link, at least one transmission command of at least one reference signal.

Possibly, said at least one transmission command (or another transmission command) can also carry at least one piece of information on the transmission power of said at least one reference signal. In particular, the transmission power of a first reference signal, used for estimating the linear distortions introduced by the satellite, can be decreased during the characterization phase, in order to avoid disturbance due to amplifier saturation, then increased during the operating phase.

In other terms, the characterization receiver 23 requests that the emitter 21, in particular the modulator of the emitter 21, emits at least one reference signal, possibly by decreasing the transmission power in order to avoid disturbance of the reference signal by the satellite amplifier saturation.

According to yet another embodiment, the transmission command (or another transmission command) also carries at least one transmission time indicator of said at least one reference signal. Such an indicator used especially to indicate if a reference signal, used for estimating the distortions introduced by the satellite, should be emitted by the emitter, and at which frequency (for example occasionally or regularly).

The emitter 21 receives (32) said at least one transmission command of at least one reference signal, from the characterization receiver 23.

The emitter 21 then emits (33) said at least one reference signal over the second transmission link passing through the satellite 22. For example, such a reference signal is transmitted in a physical layer frame generally used for padding or bitrate adaptation, such as the Dummy PLFrame according to the DVB-S2 standard.

The characterization receiver 23 receives (34) said at least one reference signal emitted by the emitter over the second transmission link passing through the satellite 22, termed received signal.

The characterization receiver estimates (35) at least one distortion generated by the satellite, from said at least one reference signal, delivering at least one piece of information on compensation of the distortions affecting the received signal. Such an estimation 35 for example involves:

the estimation 351 of at least one distortion generated by the satellite input and/or output filter ($\widehat{de f_L}$), from a reference signal among said at least one reference signal, termed first reference signal, delivering at least one piece of information on compensation of the linear distortions affecting the received signal, the estimation 352 of at least one distortion generated by the satellite amplifier ($\widehat{de f_{NL}}$), from a reference signal among said at least one reference signal, termed second reference signal, delivering at least one piece of information on compensation of the non-linear distortions affecting the received signal.

The characterization receiver 23 transmits (36) to the emitter 21, over the first transmission link, said at least one piece of distortion compensation information.

Such a transmission 36 for example involves:

the transmission 361 of said at least one piece of information on compensation of linear distortions, and the transmission 362 of said at least one piece of information on compensation of non-linear distortions.

For example, said at least one piece of information on compensation of linear distortions comprises a set of complex coefficients representing a precorrection filter of a modulator of the emitter 21, or a curve representing the response of the precorrection filter in the frequency domain in amplitude and phase (group delay).

Said at least one piece of information on compensation of non-linear distortions comprises at least one curve, or a polynomial representing said curve, among an AM/AM curve representing an output power of the amplifier in relation to the input power, and an AM/PM curve, representing a phase shift output of the amplifier in relation to the input power. Possibly, it also comprises at least one curve, or a polynomial representing said curve, representing the amplifier memory effect, i.e. at least one curve linked to the memory effect on the transmission signal.

The emitter 21 therefore receives (37) at least one piece of information on compensation of the distortions affecting the signal received by the characterization receiver, from the characterization receiver 23, over the first transmission link.

Such a reception 37 for example involves:
- the reception 371 of at least one piece of information on compensation of the linear distortions generated by the input and/or output filter of the satellite,
- the reception 372 of at least one piece of information on compensation of the non-linear distortions generated by the satellite amplifier.

It can be noted that the estimations of the linear distortions 351 and the non-linear distortions 352 can be implemented during a same step, based on a same reference signal. In this case, a single reference signal is considered, which can possibly be emitted several times. Alternatively, the estimations of linear distortions 351 and non-linear distortions 352 can be implemented during two distinct steps, implemented simultaneously or one after the other, in any order.

Likewise, the transmission (resp. reception) of at least one piece of information on compensation of linear distortions 361 (resp. 371) and non-linear distortions 362 (resp. 372) can be implemented during a same step or during two distinct steps, implemented simultaneously or one after the other, in any order.

In addition, it can be noted that the transmission (resp. reception) of at least one piece of information on compensation of linear distortions 361 (resp. 371) can be implemented after estimation of the linear distortions 351, but before estimation of the non-linear distortions 352.

Alternatively, the transmission (resp. reception) of at least one piece of information on compensation of non-linear distortions 362 (resp. 372) can be implemented after estimation of the non-linear distortions 352, but before estimation of the linear distortions 351.

Naturally, according to the embodiment considered, only the linear distortions, or only the non-linear distortions, can be estimated by the characterization receiver 23 and transmitted to the emitter 21.

On reception of the information on compensation of the linear 371 and/or non-linear distortions 372, the emitter 21 can load this information into the corresponding module of its modulator (module for precorrection of linear distortions or module for precorrection of non-linear distortions, as detailed hereinafter).

The emitter 21 and the characterization receiver 23 then enter an operating phase, during which the emitter 21 can transmit a useful signal, precorrected based on said at least one piece of distortion compensation information, to the network receivers, comprising at least the characterization receiver 23, via the satellite 22.

The operating phase continues as long as the characterization receiver 23 does not send the emitter 21 a transmission command of at least one reference signal. The characterization phase is once again implemented when the emitter 21 receives a transmission command of at least one reference signal.

5.2 Example of Characterization of Linear Distortions

Hereinafter we present an example of implementation for estimating 351 at least one distortion generated by the input filter IMUX and/or the output filter OMUX of the satellite ($\widehat{defL}$), from a first reference signal. For example, such an estimation involves adaptive equalization of the received signal. A plurality of iterations can therefore be implemented to estimate the linear distortions introduced by the satellite. Such equalization makes it possible in particular to determine the characteristics of a precorrection filter implemented in a module to precorrect the linear distortions of the emitter 21.

Indeed, the linear distortions linked to the input filter IMUX and/or the output filter OMUX of the transponder can be corrected by a finite impulse response filter implemented in the modulator of the emitter 21, for example after the shaping filter (Nyquist type filter for example). According to an advantageous embodiment, such a precorrection filter presents complex coefficients, in order to correct both amplitude and phase (and therefore group delay). For example, the coefficients of such a precorrection filter can be obtained by reproducing the coefficients of the adaptive equalizer implemented in the characterization receiver 23, once the signal is equalized. According to at least one embodiment, we seek therefore to implement an effective and stable equalizer.

Hereinafter, referring to FIGS. 4 and 5, we present different equalization techniques enabling the estimation of linear distortions.

In reference to FIGS. 4 and 5, note that:
- $U(n)$ the first reference signal emitted by the emitter (transmitted following reception of the transmission command of at least one reference signal from the characterization receiver),
- $U'(n)$ the first reference signal generated in the characterization receiver,
- $V(n)$ the output signal of the satellite transponder 41, 51, $V(n)=U(n)*H(n)$, with H corresponding to the time response of the transponder 41, 51,
- $Y(n)=V(n)+b(n)$ the signal received by the characterization receiver, with $b(n)$ corresponding to the Gaussian noise at reception
- $X(n)$ the output signal of the adaptive equalizer 42, 52, $X(n)=W(n)*Y(n)$, with $W(n)$ corresponding to the adaptive equalizer coefficients 42, 52,
- $E(n)$ the error signal, $E(n)=U'(n)-X(n)$.

If the correction is ideal, then the output signal of the adaptive equalizer $X(n)$ is equal to the first reference signal emitted by the emitter $U(n)$, because the transponder/equalizer set is transparent (the purpose being to minimize the distortions of the original signal at equalizer output).

These techniques for estimating linear distortions are based on a first reference signal, known to the characterization receiver and transmitted by the emitter on reception of a transmission command of at least one reference signal from the characterization receiver. In particular, a such first reference signal can be transmitted in a physical layer frame classically used for padding or bitrate adaptation, such as the Dummy PLFRAME according to the DVB-S2/S2X standard. Thus, the other network receivers are not disturbed by the reference signal. They remain tethered to the signal coming from the emitter even if they do not need to demodulate this reference signal.

According to a first example, illustrated in FIG. 4, equalization involves a Least Mean Square (LMS) algorithm, also termed the stochastic gradient algorithm.

In this case, the adaptive equalizer coefficients are obtained from the following recursive algorithm:

$$W(n+1)=W(n)+\mu E(n) \cdot Y^*(n)$$

with $\mu$ corresponding to the adaptation step.

It can be seen that the greater the adaptation step, the faster the algorithm converges. However, the residual noise may be higher. For example, $\mu=0.005$ is chosen.

To facilitate convergence, the initial conditions chosen are, for example:
- $W_{N/2}=1$ for N corresponding to the length of the equalizer 42,
- $W_i=0$ if not.

The LMS algorithm provides a good compromise in terms of calculation complexity, stability and convergence time.

One variant of the LMS type algorithm is the NLMS algorithm, i.e. the normalized version of the LMS algorithm.

According to a second example, also illustrated in FIG. 4, equalization involves a Recursive Least Squares (RLS) algorithm.

The principle of the RLS algorithm is the same as that of the LMS algorithm. However, calculation of the coefficients is based on a matrix calculation dependent on the length of the equalizer 42, i.e. on the length of the precorrection filter.

In this case, the adaptive equalizer coefficients are obtained from the following recursive algorithm:

$$W(n+1)=W(n)+K(n)\cdot E(n)$$

with: $K(n)=P(n)\cdot Y(n)/(l+Y^T(n)\cdot P(n)\cdot Y(n))$ $$P(n+1)=l^{-1}P(n)-l^{-1}K(n)\cdot Y^T(n)\cdot P(n)$$

with l corresponding to the forgetting factor, less than 1.

In this case, the smaller the forgetting factor, the faster the algorithm converges. However, the residual noise may be higher. For example, l=0, 996 is chosen.

According to a third example, illustrated in FIG. 5, equalization is implemented using the frequency domain FDE (Frequency Domain Equalizer).

The purpose of this algorithm is to find the response in amplitude and in phase of the precorrection filter in the frequency domain. For this, the reference signal U'(n) generated in the characterization receiver is transposed in frequency through a time to frequency transformation of the FFT type 53. The output signal X(n) of the adaptive equalizer 52 is also transposed in frequency through a time/frequency transformation of the FFT type 54. It is then divided by a reference frequency template 55, obtained from the reference signal U'(n) transposed in frequency, in order to estimate the frequency distortions. The estimated frequency distortions are then transposed to the time domain, through frequency to time transformation of the IFFT type 53, so as to find the coefficients W(n) of the adaptive equalizer 52, and subsequently the precorrection filter coefficients.

For example, the adaptive equalizer coefficients are obtained from the following recursive algorithm:

$$W(n+1)=W(n)+\alpha\cdot E(n)$$

with $\alpha$ corresponding to a forgetting factor used to eliminate Gaussian noise.

The equalization techniques presented hereinafter, which can be implemented to estimate 351 at least one distortion generated by the input and/or output filter of the satellite, make it possible to directly obtain the complex coefficients of the precorrection filter. Alternatively, it is possible to obtain at equalizer output a curve representing the precorrection filter response or other information representative of the precorrection filter.

The information thus received on compensation of linear distortions affecting the received signal can then be transmitted to the emitter module for precorrection of linear distortions (precorrection filter).

5.3 Example of Characterization of Non-Linear Distortions

We present hereinafter an example of implementation of the estimation 352 of at least one distortion generated by the satellite amplifier ($\widehat{defN1}$), from a second reference signal. For example, such an estimation involves modeling of the amplifier based on the second reference signal. Such modeling makes it possible in particular to determine the AM/AM and AM/PM curves characterizing the amplifier, especially tube amplifiers, and subsequently, the distortion(s) to be introduced to the constellation of symbols in the modulator in view of these curves. For example, the article "DVB-S2 Modem Algorithms Design and Performance over Typical Satellite Channels" (E. Casini et al., INTERNATIONAL JOURNAL OF SATELLITE COMMUNICATIONS AND NETWORKING 2004; 22:281-318) proposes a precompensation technique for non-linear distortions.

Thus, non-linear distortions linked the power amplifier of the satellite transponder can be precorrected by distortion of the constellation in the emitter modulator, before the shaping filter.

If one considers a traveling-wave tube amplifier, there is no memory effect on the frequency range targeted. However, the shaping filter of the modulator as well as the input IMUX and output OMUX filters of the satellite transponder introduce a memory effect. According to at least one embodiment, the invention makes it possible to set the algorithms used to estimate the non-linear distortions, so as to characterize the transponders with or without memory effect.

We present hereinafter, referring to FIGS. 6 and 7, different techniques to estimate non-linear distortions.

The following can be noted:
U(n) the second reference signal emitted by the emitter (transmitted following the reception of the transmission command of at least one reference signal from the characterization receiver),
U'(n) the second reference signal generated in the characterization receiver,
V(n) the output signal of the satellite transponder 61, 71, V(n)=U(n)*H(n), with H corresponding to the time response of the transponder 61, 71,
Y(n) the signal received by the characterization receiver, Y(n)=V(n)+b(n), with b(n) corresponding to the Gaussian noise at reception.

For example, such techniques are based on a mathematical model that models the behavior of the amplifier to be precorrected, in this case, a polynomial model with memory effect, and on an iterative algorithm that estimates the coefficients of the polynomial model:

$$V'(n) = \sum_k \sum_l a_{kl} \cdot U'(n-l) \cdot |U'(n-l)|^k$$

where: k∈K corresponds to the order of the polynomial (for example equal to 5, or more generally in the range of 3 to 7), and l∈L corresponds to the depth of memory effect (if l=0, there is no memory effect).

These techniques to estimate non-linear distortions are based on a second reference signal, known to the characterization receiver and transmitted by the emitter on reception of a transmission command of at least one reference signal from the characterization receiver. In particular, such a second reference signal can be transmitted in a physical layer frame classically used for padding or bitrate adaptation, such as the Dummy PLFRAME according to the DVB-S2/S2X standard, modified to have a peak-to-average ratio adapted to the modulation underway, without however disturbing synchronization of the network receivers other than the characterization receiver(s).

Such a modified frame can be inserted into the modulator before the shaping filter. The modulated data associated with this modified frame, and therefore with the second reference signal, distorted by the transponder amplifier and the noise, are received by the characterization receiver, demodulated through the shaping filter, and compared with the second reference signal known to the characterization receiver. Thus, the characterization receiver compares the modified Dummy PLFRAME emitted with a modified Dummy PLFRAME known to the characterization receiver.

According to a first example illustrated in FIG. 6, using an algorithm to characterize non-linear distortions based on the trend curve, the samples of the second reference signal are classified in increasing order of amplitude (corresponding to the input power, AMi, of the amplifier), with the corresponding samples of the received signal in the classification block 62. In this way, a set of points (Us, Ys) is obtained, illustrating the power of the received signal in relation to the power of the signal emitted. A polynomial interpolation is used in the interpolation block 63. In this way, the AM/AM and AM/PM plots are obtained. We then determine, in block 64, the polynomial coefficients of the curves closest to the points of the AM/AM and AM/PM plots. We obtain at output the output power, AMo, and the phase, PMo, values of the amplifier in relation to the input power, AMi.

One interest of such an algorithm based on the trend curve is that the computation time is short.

According to a second example illustrated in FIG. 7, using an algorithm to characterize non-linear distortions based on the Volterra model, we use the NL-iteration algorithm 72, to estimate in the block 73 the coefficients of the polynomial model. We obtain at output the AMo output power and PMo phase values of the amplifier in relation to the AMi input power.

For example, the computation of the polynomial coefficients is based on the article "A Generalized Memory Polynomial Model for Digital Predistorsion of RF Power Amplifier" (IEEE TRANSACTIONS ON SIGNAL PROCESSING, VOL. 54, NO. 10, 10/2006).

One interest of an algorithm based on the Volterra model is the fact that it takes memory effects into consideration. Indeed, such an algorithm offers the possibility of identifying the AM/AM and AM/PM curves as well as the parameters of the memory effect.

The techniques for characterizing non-linear distortions presented here above, which can be used for the estimation 352 of at least one distortion generated by the satellite amplifier, make it possible to directly obtain the coefficients of the polynomials describing the AM/AM and AM/PM curves. Alternatively, it is possible to obtain the AM/AM and AM/PM curves or other information representative of these curves.

The information thus obtained on compensation of the non-linear distortions affecting the received signal can then be transmitted to the emitter module for precorrection of non-linear distortions.

5.4 Example of a Transmission Chain

Described hereinafter is an example of implementation of the invention in a transmission system according to the DVB-S2 standard. It should be recalled that this is a simple example and that the invention has applications in any satellite transmission system, whatever the standard considered.

FIG. 8 illustrates the main blocks of a transmission chain according to the DVB-S2 standard, according to a particular embodiment of the invention. Such a transmission chain comprises an emitter 81, a satellite transponder 82, and a characterization receiver 83.

The emitter 81 complies with the DVB-S2 standard as described in the aforementioned document ETSI EN 302 307-1 V1.4.1. It comprises in particular the modules necessary to develop the physical layer of a DVB-S2 link. The emitter comprises for example a stream adaptation module 811, an FEC coding module 812, and a modulator 813. The modulator 813 comprises a mapping module 8131, a PL Framing module 8132, a precorrection module for non-linear distortions 8133, a modulation module 8134, and a precorrection module for linear distortions 8135.

In particular, the PL Framing module 8132 generates PLFRAMEs comprising a PLHEADER and a payload. This module can especially insert padding frames or bitrate adaptation frames, termed Dummy PLFRAMEs, between the useful frames, before scrambling at the physical layer level.

The modulation module 8134 generates a DVB-S2 radiofrequency signal intended for transmission to the characterization receiver via the satellite.

Aside from the precorrection modules for non-linear 8133 and linear 8135 distortions, the other modules are classic and are described, in particular, in the aforementioned standard.

The satellite transponder 82 comprises for example an input filter IMUX, a high power amplifier (HPA), and an output filter OMUX. For example, the satellite transponder operates in the Ku band and at a bandwidth of 36 MHz.

The characterization receiver 83 comprises a radiofrequency reception module 831, a demodulator 832, a DVB S2 decoding module 833 and a DVB S2 adaptation module 834.

The reception module 831 implements, in particular, an analog-to-digital conversion of the radiofrequency signal received, and allows synchronization with the received signal.

The demodulator 832 comprises a linear distortion estimation module 8321 (for example an equalizer), a symbol rate synchronization module 8322, a frame synchronization module 8323, a descrambling module 8324, a non-linear distortion estimation module 8325 (characterization of non-linear distortions) and a demapping module 8326.

Aside from the linear 8321 and non-linear 8325 distortion estimation modules, the other models are classic.

As illustrated in FIG. 8, the characterization elements therefore comprise:
  on the one hand, a linear distortion precorrection module 8135, taking for example the form of a precorrection filter, at emitter output 81, and a linear distortion estimation module 8321, taking for example the form of an equalizer, at characterization receiver input 83;
  on the other hand, a non-linear distortion precorrection module 8133, implementing for example a symbol constellation distortion, upstream from the shaping filter in the emitter 81, and a non-linear distortion estimation module 8325, downstream from the shaping filter in the characterization receiver 83.

The linear distortion estimation module 8321 estimates at least one linear distortion generated by the input and/or output filter of the satellite 82, from a first reference signal, and delivers at least one piece of information on compensation of the linear distortions affecting the received signal (for example, of the precorrection filter coefficient type), transmitted to the linear distortion precorrection module 8135.

The non-linear distortion estimation module 8325 estimates at least one non-linear distortion generated by the satellite amplifier 82, from a second reference signal, and delivers at least one piece of information on compensation of non-linear distortions affecting the received signal (for example, of polynomial model coefficients type that model amplifier behavior), transmitted to the non-linear distortion precorrection module 8133.

For example, the first reference signal is transmitted from the emitter to the characterization receiver via the satellite in a classic Dummy PLFRAME according to the DVB-S2 standard, comprising a PLHeader and 36 unmodulated carrier slots ($I=1/\sqrt{2}$, $Q=1/\sqrt{2}$). To this end, the characterization receiver 83 transmits in advance to the emitter 81, over the first transmission link, a transmission command of at least one classic Dummy PLFRAME. The characterization receiver 83 thus knows the first reference signal.

The second reference signal can be transmitted in a proprietary frame such as a Dummy PLFRAME, i.e. having the same header, PLHeader, and the same length as a classic Dummy PLFRAME. Such a modified Dummy PLFRAME comprises a PLHeader and a plurality of slots, each one comprising a set of symbols forming the second reference signal. In this way, the classic receivers (i.e. other than characterization receivers) are not disturbed by the reception of this proprietary frame. In particular, the set of symbols comprises the symbols of a constellation associated with a modulation, with different levels of power (i.e. amplitude) attributed to each symbol.

To this end, the characterization receiver 83 transmits in advance to the emitter 81, over the first transmission link, a transmission command of at least one modified Dummy PLFRAME. In particular, the characterization receiver 83 transmits to the emitter 81 the content of the Dummy PLFRAME, i.e. the IQ samples that the modulator must insert in the DVB-S2 stream. The characterization receiver 83 thus knows the second reference signal. The PL Framing module 8132 can then insert the modified Dummy PLFRAME between the useful frames, according to the insertion frequency chosen.

For example, in the context of the DVB-S2 standard, the modified Dummy PLFRAME comprises a PLHeader and 36 slots, each comprising 90 symbols for one modulation, QPSK for example, the power of each symbol varying around a nominal power. For example, the 36 slots carry the symbols defined by the pairs (I, Q) such as $I=\alpha/\sqrt{2}$, $Q=\alpha/\sqrt{2}$ with $\alpha$ varying between 0.5 and 2.

In this case, the characterization receiver 83 transmits to the emitter 81 the IQ samples such as $I=\alpha/\sqrt{2}$, $Q=\alpha/\sqrt{2}$, with $\alpha$ varying between 0.5 and 2, which the modulator must insert in the DVB-S2 stream.

According to a first example, the characterization receiver 83 always transmits the same frame of IQ samples, with a being fixed. Alternatively, the characterization receiver 83 transmits to the emitter 81 a frame of IQ samples adapted during the iterations, in order to fine-tune the characterization.

It can be noted that the use of padded physical layer frames (Dummy frames) to transmit reference signal(s) ensures in particular continuous service.

Alternatively, it is possible to modify the header of the padded physical layer frames to transmit reference signal(s).

FIGS. 9A and 9B illustrate the constellation associated with the modified Dummy PLFRAME for a QPSK modulation. Naturally, other modulations, and thus other constellations, can be used, by varying the power (i.e. the amplitude) of the constellation symbols.

In particular, FIG. 9A illustrates the constellation at modulator output. In this Figure it can be seen that the four symbols of the QPSK modulation are emitted with different levels of power, varying between a minimal power parameter Pmin and a maximum power parameter Pmax. According to the example illustrated in FIG. 9A, Pmin equals −9 dB and Pmax equals +5 dB. These Pmin and Pmax values depend for example on the Input Back-Off (IBO) provided by the user.

FIG. 9B illustrates the constellation distorted by a memory-free amplifier, at amplifier output.

Thus, according to a particular embodiment, three different types of command are defined at the level of the characterization receiver 83, and transmitted to the emitter 81 over the first transmission link:

at least one control command, comprising a transmission command of the reference signal(s), making it possible to launch the characterization phase, to update the precorrections, and to stop the reference signal transmission;

at least one piece of information on compensation of linear distortions, for example in the form of a file of linear precorrections based on the coefficients of a complex filter;

at least one piece of information on compensation of non-linear distortions, for example in the form of a file comprising tables for non-linear precorrections.

In particular, the control commands comprise two commands defined both for the emitter and the characterization receiver, for the purpose of inserting at least one specific frame (modified Dummy PLFrame) between the useful frames:

Validation of insertion of the specific frame:
0: no insertion,
1: occasional insertion,
2: regular insertion according to the duration hereinafter;

Insertion duration in steps of 1 ms (varies from 1 to 60000)

In addition, the characterization receiver provides the emitter with the content of the specific frame that the modulator must insert in the radiofrequency signal passing through the satellite transmission path (DVB-S2 stream, for example).

For example, the characterization receiver provides the emitter with a file comprising the IQ samples to be inserted directly into a padded physical layer frame (for example the modified Dummy PLFrame), before the non-linear precorrections and the shaping filter.

Said at least one piece of information on compensation of linear distortions is for example transmitted in the form of a file comprising the coefficients to be used in the filter, composed of two columns: one column containing the real part of the coefficients and one column containing the imaginary part of the coefficients.

Said at least one piece of information on compensation of non-linear distortions is for example transmitted in the form of a file comprising tables to be used for the non-linear precorrections, comprising the AM/AM and AM/PM curves in the form of a polynomial.

5.5 Devices

Finally, referring to FIGS. 10 and 11, we present the simplified structure of a characterization receiver and of an emitter according to one embodiment of the invention.

As illustrated in FIG. 10, a characterization receiver, according to one embodiment of the invention, comprises a memory 101 (comprising for example a buffer memory) and a processing unit 102 (equipped for example with at least one processor, FPGA or DSP), driven or pre-programmed by an application or a computer program 103 implementing the method for receiving a radiofrequency signal transmitted via a satellite according to one embodiment of the invention. At initialization, the code instructions of the computer program 103 are for example loaded into a RAM and then executed by the processing unit 102. The processing unit 102 implements the steps of the reception method described here above, according to the instructions of the computer program 103, to characterize the linear and/or non-linear distortions of the satellite transponder.

To this end, according to one embodiment, the processing unit 102 is configured to:
- transmit to the emitter, over a first transmission link, at least one transmission command of at least one reference signal,
- receive the reference signal(s), emitted by the emitter over a second transmission link via the satellite, termed received signal,
- estimate at least one distortion generated by the satellite, from the reference signal(s), delivering at least one piece of information on compensation of the linear and/or non-linear distortions affecting the received signal,
- transmit to the emitter, over the first transmission link, said at least one piece of information on compensation of the linear and/or non-linear distortions.

As illustrated in FIG. 11, an emitter, according to one particular embodiment of the invention, comprises a memory 111 (comprising for example a buffer memory) and a processing unit 112 (equipped for example with at least one processor, FPGA, or DSP), driven or pre-programmed by an application or a computer program 113 implementing the transmission method according to one embodiment of the invention.

At initialization, the code instructions of the computer program 113 are for example loaded into a RAM and then executed by the processing unit 112. The processing unit 112 receives at input a transmission command of at least one reference signal. The processing unit 112 implements the steps of the transmission method described here above, according to the instructions of the computer program 113, to compensate at least partially the linear and/or non-linear distortions introduced by the satellite transponder.

To this end, according to one embodiment, the processing unit 112 is configured to:
- receive at least one transmission command of at least one reference signal, from the characterization receiver, over a first transmission link,
- transmit the reference signal(s), to the characterization receiver, over a second transmission link via the satellite,
- receive at least one piece of information on compensation of the distortions affecting the signal received by the characterization receiver, from the characterization receiver, over the first transmission link.

The invention claimed is:

1. A reception method for receiving a radiofrequency signal, in a system comprising an emitter, a satellite and at least one characterization receiver, said method comprising the at least one characterization receiver implementing a characterization phase of the satellite, comprising:
   - transmitting to said emitter, over a first transmission link between said characterization receiver and said emitter, at least one transmission command of at least one reference signal,
   - receiving said at least one reference signal, emitted by said emitter over a second transmission link between said emitter and said characterization receiver via said satellite, termed a received signal,
   - estimating at the characterization receiver at least one distortion generated by the satellite, from said at least one reference signal; delivering at least one piece of information on compensation of distortions affecting the received signal based on the estimated distortion, and
   - transmitting to said emitter, over said first transmission link, said at least one piece of information on compensation of distortions.

2. The reception method according to claim 1, said estimating includes:
   - estimating at least one distortion generated by the input and/or output filter of the satellite, from a reference signal among said at least one reference signal, termed first reference signal, delivering at least one piece of information on compensation of linear distortions affecting the received signal,
   - estimating at least one distortion generated by the satellite amplifier, from a reference signal among said at least one reference signal, termed second reference signal, delivering at least one piece of information on compensation of non-linear distortions affecting the received signal,
   - and wherein said transmitting said at least one piece of information on compensation of distortion comprises:
   - transmitting said at least one piece of information on compensation of linear distortions, and
   - transmitting said at least one piece of information on compensation of non-linear distortions.

3. The reception method according to claim 2, wherein said at least one piece of information on compensation of linear distortions comprises a set of complex coefficients representing a precorrection filter of a modulator of said emitter, or a curve representing the response in amplitude and in phase of said precorrection filter in the frequency domain.

4. The reception method according to claim 2, wherein said at least one piece of information on compensation of non-linear distortions comprises at least one curve, or a polynomial representing said curve, among an amplitude/amplitude (AM/AM) curve representing the output power of the amplifier in relation to the input power, an amplitude/phase (AM/PM) curve representing a phase shift output of the amplifier in relation to the input power, and a curve representing the amplifier memory effect.

5. The reception method according to claim 2, wherein said second reference signal is said first reference signal.

6. A transmission method for transmitting a radiofrequency signal in a system comprising an emitter, a satellite and at least one characterization receiver, said method comprising the emitter implementing a characterization phase of the satellite comprising:
   - receiving at least one transmission command of at least one reference signal, from said characterization receiver, over a first transmission link between said characterization receiver and said emitter,
   - transmitting said at least one reference signal, to said characterization receiver, over a second transmission link between said emitter and said characterization receiver via said satellite, and
   - receiving at least one piece of information on compensation of distortions affecting the signal received by the characterization receiver, from said characterization receiver, over said first transmission link, the at least one piece of information being based on an estimate, made by the characterization receiver from the at least one reference signal, of at least one distortion generated by the satellite.

7. The transmission method according to claim 6, wherein receiving the at least one piece of information on compensation of distortions comprises:
receiving at least one piece of information on compensation of linear distortions generated by the input and/or output filter of the satellite,
receiving at least one piece of information on compensation of non-linear distortions generated by the satellite amplifier.

8. The transmission method according to claim 6, further comprising an operating phase comprising:
precorrecting a useful signal, from said at least one piece of information on compensation of distortions.

9. The transmission method according to claim 6, wherein said reference signal is transmitted in a padded physical layer frame.

10. The transmission method according to claim 6, wherein said reference signal is transmitted in a Dummy type physical layer frame (PLFRAME) according to the Digital Video Broadcasting-Satellite-Second Generation (DVB-S2) or Digital Video Broadcasting-Satellite-Second Generation extension (DVB-S2X) standards.

11. The transmission method according to claim 10, wherein said Dummy type PLFRAME comprises a physical layer header (PLHeader) and a plurality of slots, each slot comprising a set of symbols forming said reference signal, and wherein said set of symbols comprises the symbols of a modulation with different power levels.

12. The transmission method according to claim 6, wherein said at least one transmission command also carries at least one time indicator for transmitting said at least one reference signal.

13. The reception method according to claim 1, wherein said at least one piece of information on compensation of distortions and/or said transmission command of at least one reference signal is transmitted from said characterization receiver to said emitter over an internet protocol (IP) link.

14. The reception method according to claim 1, wherein said transmission over the first transmission link presents a lower bitrate than transmission over the second transmission link.

15. A characterization receiver of a radiofrequency signal, comprising:
at least one processor operatively coupled to a memory, and configured to:
transmit to an emitter, over a first transmission link between said characterization receiver and said emitter, at least one transmission command of at least one reference signal,
receive said at least one reference signal, emitted by said emitter over a second transmission link between said emitter and said characterization receiver via a satellite, termed a received signal,
estimate at least one distortion generated by said satellite, from said at least one reference signal, delivering at least one piece of information on compensation of distortions affecting the received signal based on the estimated distortion, and
transmit to said emitter, over said first transmission link, said at least one piece of information on compensation of distortions.

16. An emitter of a radiofrequency signal comprising:
at least one processor operatively coupled to a memory, and configured to:
receive at least one transmission command of at least one reference signal, from a characterization receiver, over a first transmission link between said characterization receiver and said emitter,
transmit said at least one reference signal, to said characterization receiver, over a second transmission link between said emitter and said characterization receiver via a satellite, and
receive at least one piece of information on compensation of distortions affecting the signal received by the characterization receiver, from said characterization receiver, over said first transmission link, the at least one piece of information being based on an estimate, made by the characterization receiver from the at least one reference signal, of at least one distortion generated by the satellite.

17. A non-transitory computer-readable medium comprising instructions stored thereon which when executed by a processor of a characterization receiver of a radiofrequency signal configure the characterization receiver to:
transmit to an emitter, over a first transmission link between said characterization receiver and said emitter, at least one transmission command of at least one reference signal,
receive said at least one reference signal, emitted by said emitter over a second transmission link between said emitter and said characterization receiver via a satellite, termed a received signal,
estimate at least one distortion generated by said satellite, from said at least one reference signal, delivering at least one piece of information on compensation of distortions affecting the received signal based on the estimated distortion, and
transmit to said emitter, over said first transmission link, said at least one piece of information on compensation of distortions.

18. A non-transitory computer-readable medium comprising instructions stored thereon which when executed by a processor of an emitter of a radiofrequency signal configure the characterization receiver to:
receive at least one transmission command of at least one reference signal, from a characterization receiver, over a first transmission link between said characterization receiver and said emitter,
transmit said at least one reference signal, to said characterization receiver, over a second transmission link between said emitter and said characterization receiver via a satellite, and
receive at least one piece of information on compensation of distortions affecting the signal received by the characterization receiver, from said characterization receiver, over said first transmission link, the at least one piece of information being based on an estimate, made by the characterization receiver from the at least one reference signal, of at least one distortion generated by the satellite.

* * * * *